(12) United States Patent
Demizu et al.

(10) Patent No.: US 6,889,655 B1
(45) Date of Patent: May 10, 2005

(54) DEVICE FOR CONTROLLING THE IGNITION TIMING FOR INTERNAL COMBUSTION ENGINES

(75) Inventors: Akira Demizu, Tokyo (JP); Minoru Abe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/948,537

(22) Filed: Sep. 24, 2004

(30) Foreign Application Priority Data

May 12, 2004 (JP) .................................... P2004-142787

(51) Int. Cl.$^7$ ................................................. F02P 5/00
(52) U.S. Cl. ................................................. 123/406.16
(58) Field of Search ..................... 123/406.13, 406.12, 123/406.16, 406.21, 406.29, 406.34, 406.38, 406.39

(56) References Cited

U.S. PATENT DOCUMENTS 4,425,891 A * 1/1984 Kashimura et al. ..... 123/406.16
4,508,079 A * 4/1985 Komurasaki et al. .. 123/406.33

FOREIGN PATENT DOCUMENTS

JP 60-26173 A 9/1985
JP 6-92748 B 11/1994

* cited by examiner

Primary Examiner—Bibhu Mohanty
(74) Attorney, Agent, or Firm—Sughrue Mion, PLLC

(57) ABSTRACT

A device for controlling the ignition timing for internal combustion engines correctly detecting fault of a knocking sensor over the whole rotational range of the engine. The device for controlling the ignition timing takes out knocking signals and produces an ignition timing control signal relying upon the knocking signals, and comprises a knocking sensor 1, a microcomputer 2 for producing a fault detection execution signal for executing the detection of fault of the knocking sensor and for applying a pulse voltage to the knocking sensor 1 relying upon the fault detection execution signal, comparison means 5 and 6 for comparing the charging voltage or discharging voltage of the knocking sensor 1 with two different threshold values, and logic means (NOR circuit) 7 for obtaining an OR of the outputs of the comparison means 5 and 6. The microcomputer 2 finds the sum of pulse widths output by the logic means during the period of detecting the fault and judges the fault of the knocking sensor relying upon the sum that is found of the pulse widths.

2 Claims, 4 Drawing Sheets

FIG. 3

| CONDITION | (a) NORMAL | (c) SHORT-CIRCUIT-TO-SOURCE | (d) EARTHING | (b) BREAKAGE OF LINE |
|---|---|---|---|---|
| INPUT VA CONDITION | NORMAL SGL INPUT | SHORT-CIRCUITED TO Batt | SHORT-CIRCUITED TO GND | LINE IS BROKEN |
| INPUT VA WAVEFORM | $V_B$, $V_C$, 0; waveform with $T_D$ | Batt, $V_B$, $V_C$, 0; with $T_D$ | $V_B$, $V_C$, 0; with $T_D$ | $V_B$, $V_C$, 0; with $T_D$ |
| JUDGE TO BE SHORT-CIRCUITED TO THE SOURCE VE | 0; $tL \gg T_0$ | $V_{CC}$, 0; $tL = 0 \ll T_0$ | 0; $tL \gg T_0$ | 0 |
| JUDGE TO BE EARTHING VG | 0; $tL \gg T_0$ | $V_{CC}$, 0; $tL \gg T_0$ | $V_{CC}$, 0; $tL = 0 \ll T_0$ | 0 |
| LINE IS JUDGED TO BE BROKEN VF | 0; $tL > T_0$ | 0 | 0; $tL \gg T_0$ | $V_{CC}$, 0; $tL < T_0$ |
| COMMENTS | NORMAL SINCE VE, VG, VF, ARE ALL SATISFYING $tL > T_0$ | JUDGED TO BE SHORT-CIRCUITED TO THE SOURCE SINCE VE ONLY IS $tL \ll T_0$  ASTRONOMICAL-ABNORMALITY | JUDGED TO BE EARTHING SINCE VG ONLY IS $tL \ll T_0$  EARTH-ABNORMALITY | JUDGE TO BE THE LINE IS BROKEN SINCE VF ONLY IS $tL < T_0$  BREAKAGE-ABNORMALITY |

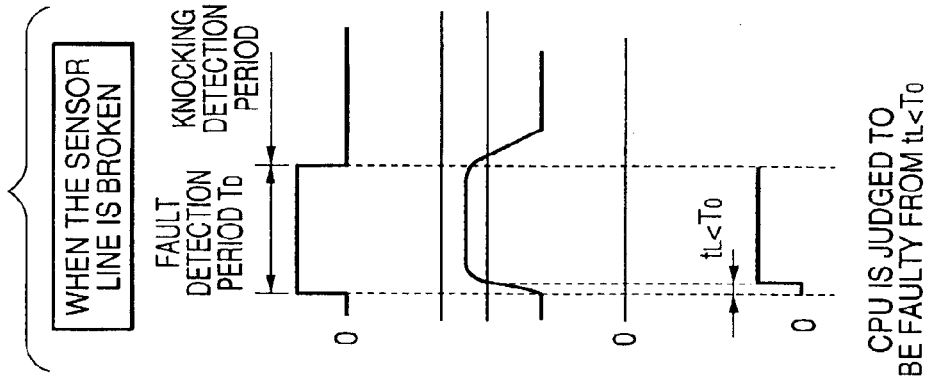
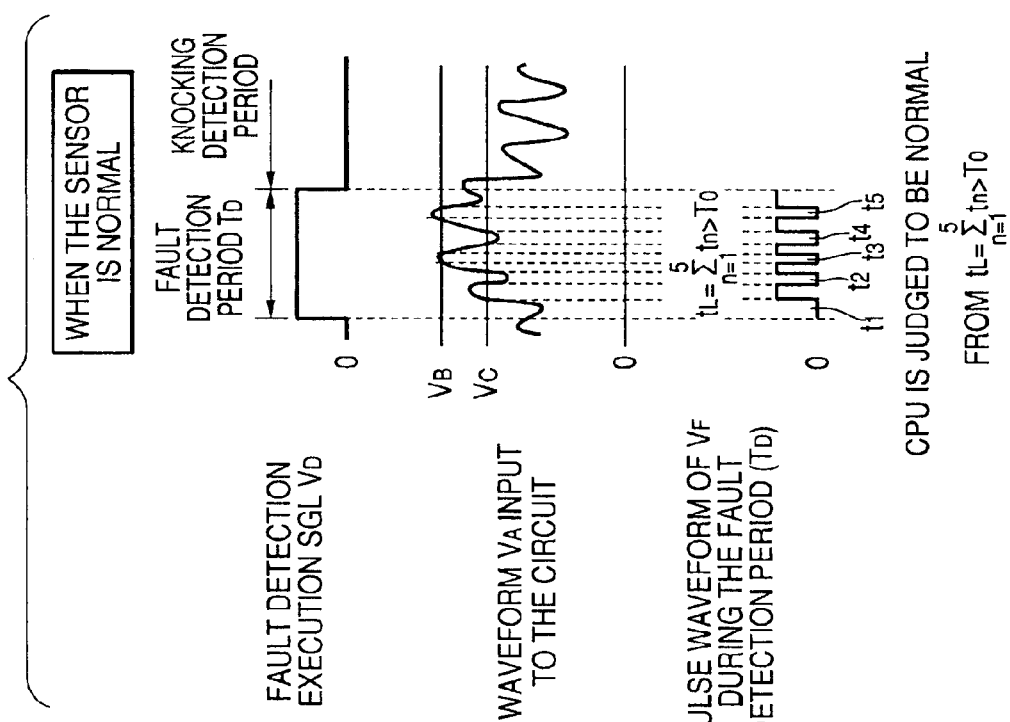

DEVICE FOR CONTROLLING THE IGNITION TIMING FOR INTERNAL COMBUSTION ENGINES

BACKGROUND OF THE INVENTION

1. Field of the Invention

This invention relates to a device for controlling the ignition timing for internal combustion engines.

2. Description of the Related Art

There has been widely known a device which detects the knocking of an internal combustion engine and controls the ignition timing of the internal combustion engine relying upon a knocking signal. The knocking is usually detected by using a knocking sensor. If the knocking sensor becomes faulty such as breakage in the line, it becomes impossible for the sensor to detect the knocking. As a result, the ignition timing control of the internal combustion engine no longer works, which sometimes causes the internal combustion engine to be damaged. It is therefore very important to detect the fault in the knocking sensor.

JP-B-6-92748 discloses a device for controlling the ignition timing for internal combustion engines, which is capable of detecting a fault in the knocking sensor. This device is designed to precisely detect the broken line fault in the knocking detector that uses a piezoelectric element. Namely, this device detects the fault by measuring a change in the charging voltage or in the discharging voltage when the voltage is applied to the knocking detector from the ignition timing control device or when the voltage is cut. This is based on a discovery that the knocking detector has a capacity and, hence, there occurs a large difference in the capacity between when the knocking detector is normal and when the line is broken. Namely, when a predetermined voltage is applied to the knocking detector, a value of charging voltage or discharging voltage is measured after the passage of a predetermined period of time, namely the magnitude of the voltage is used for judging the fault of the knocking detector.

In the conventional device for controlling the ignition timing for internal combustion engines as described above, when a predetermined voltage is applied for detecting the fault and the voltage is read after the passage of a predetermined period of time, whether the knocking sensor is normal is judged relying upon the magnitude of the voltage. In the low speed region of the engine, therefore, it is easy to judge whether the knocking detector is normal. In the high speed region, however, it becomes difficult to render the judgement. The reason is that since the mechanical vibration of the engine is increased in a high speed region of the engine, a large distortion in the waveform of the voltage from which the fault is detected occurs, and thereby the comparison concerning their magnitudes between the voltage from which the knocking is to be judged and a reference value becomes difficult for making a distinction between the normal state and the breakage of the line. Therefore, despite the knocking detector is normal, the judgement is often incorrectly rendered to be the breakage of line. Therefore, the level of the knocking signals had to be also used for judging the fault in the high speed region only.

SUMMARY OF THE INVENTION

The present invention was accomplished in order to solve the above problems.

An object of the invention is to obtain a device for controlling the ignition timing for internal combustion engines, that is capable of correctly judging the defect even in a high speed region of the engine. A further object of the invention is to provide a device for controlling the ignition timing for internal combustion engines capable of detecting not only the breakage of line of the knocking sensor but also the fault caused by the so-called short-circuit-to-the-source in which the knocking sensor is short-circuited on the power source side or by the so-called earthing in which the knocking sensor is short-circuited on the grounding side.

A device for controlling the ignition timing for internal combustion engines according to the invention is a device for controlling the ignition timing taking out knocking signals by detecting the vibration of the engine body due to the knocking phenomenon and generating an ignition timing control signal relying upon the knocking signals, comprising a knocking sensor for detecting the knocking of the engine, a microcomputer for producing a fault detection execution signal for executing the detection of fault of the knocking sensor and for temporarily applying a pulse voltage to the knocking sensor relying upon the fault detection execution signal, comparison means for comparing the charging characteristics or discharging characteristics of the knocking sensor with two different threshold values at the time of applying the pulse voltage to produce an output of a low level or a high level, and logic means (NOR circuit) for obtaining an OR of the output levels of the comparison means, wherein the microcomputer finds the sum of pulse widths of output by the logic means during the period of detecting the fault and judges the fault of the knocking sensor relying upon the sum of the found pulse widths.

Further, the microcomputer finds the sum of periods of the low level or the high level of the comparison means, and judges the fault of the knocking sensor relying upon the sum of the found periods.

The invention is so constituted as to judge the fault based on the sum of times of low-level pulse widths of output of two comparison means that convert transient characteristics of the knocking sensor during the charging or discharging and of the logic means. It is therefore allowed to easily and correctly detect broken line fault, short-circuit-to-the-source fault or earthing fault of the knocking sensor over the whole rotational range of the engine.

BRIEF DESCRIPTION OF THE DRAWINGS

FIG. 3 is a time chart illustrating the judgement of other faults in the device for controlling the ignition timing for internal combustion engines according to the embodiment 1; and FIGS. 4A–4B are time charts illustrating the judgement of broken line fault of the device for controlling the ignition timing for internal combustion engines in a high speed range according to the embodiment 1.

DESCRIPTION OF THE PREFERRED EMBODIMENT

Figure 1:
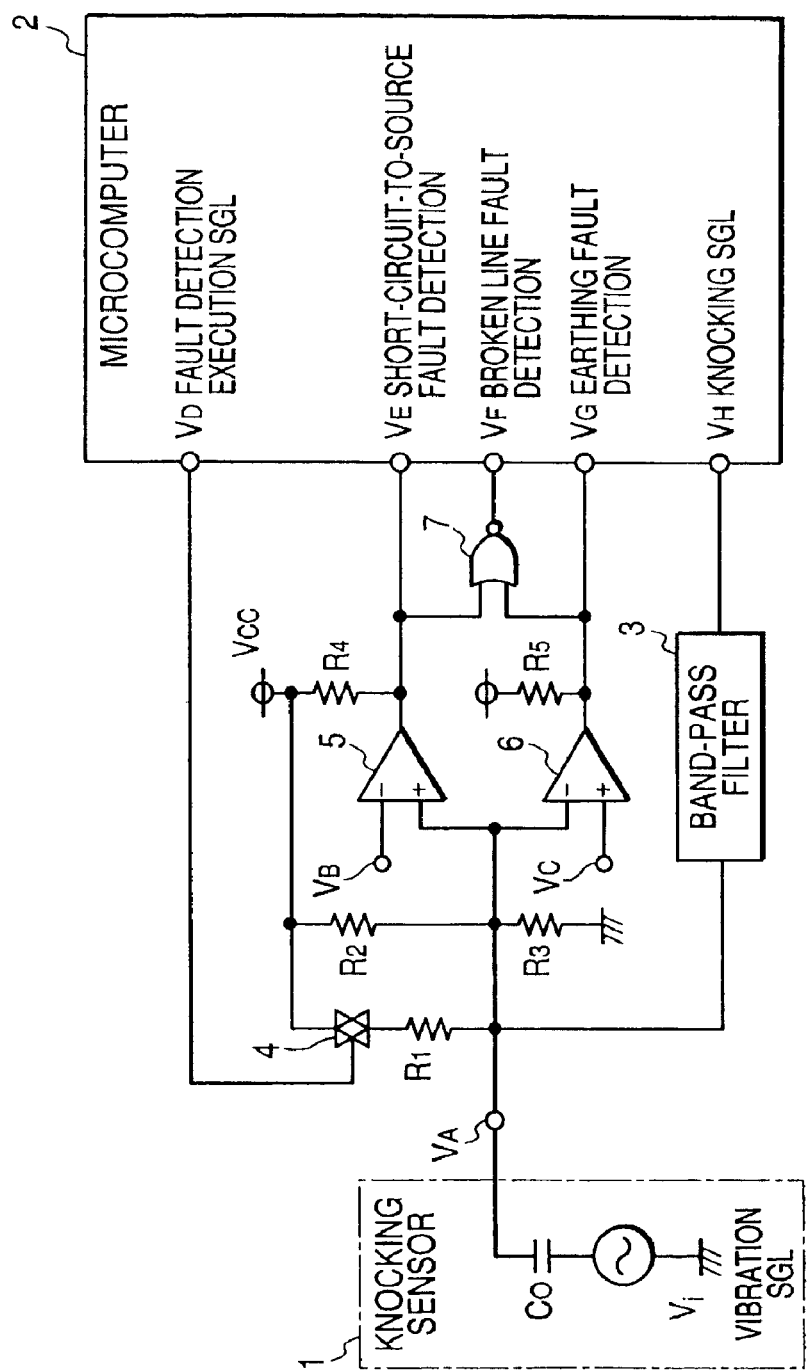
FIG. 1 is a circuit diagram of a device for controlling the ignition timing for internal combustion engines according to an embodiment 1 of the invention.

An embodiment of the invention is illustrated in FIG. 1 in which a device for controlling the ignition timing for internal combustion engines of the invention includes a knocking sensor 1 and a microcomputer 2. The knocking sensor 1 is, for example, a piezoelectric element which detects vibration produced by the engine and produces electric signals. As shown in FIG. 1, the knocking sensor 1 is electrically equivalent to a signal source producing vibration signals Vi and a capacitor having a capacity $C_0$. The microcomputer 2 has a function for receiving knocking signals VII from the knocking sensor 1 to calculate a signal for controlling the ignition timing, a function for producing an output to an ignitor that is not shown, a function for judging the fault in the knocking sensor upon receiving a fault detection signal that will be described later, and a function for producing a fault detection execution signal $V_D$ when it is necessary to detect the fault.

The output of the knocking sensor 1 is fed to the microcomputer 2 through a band-pass filter 3 that picks up the knocking signals. The output terminal of the knocking sensor 1 is connected to a power source voltage VCC through a resistor R1 and a switch 4 which is switching means. The switch 4 is controlled so as to be opened and closed by a fault detection execution signal $V_D$ from the microcomputer 2. The output terminal of the knocking sensor 1 is connected to a voltage-dividing point of resistors R2 and R3 for applying a bias connected between a power source (Batt) and ground GND, and is further connected to comparators 5 and 6 which are comparison means.

In executing the fault detection, the comparator 5 compares a circuit input signal $V_A$ added to the output terminal of the knocking sensor 1 with a first threshold value $V_n$, and feeds a short-circuit-to-the-source fault detection signal $V_E$ of the low level or of the high level which is the output voltage thereof to the microcomputer 2. Here, the short-circuit-to-the-source means that the circuit is short-circuited to the power source side. The comparator 6 compares the circuit input signal $V_A$ added to the output terminal of the knocking sensor 1 with a second threshold value $V_C$, and feeds an earthing fault detection signal $V_G$ of the low level or the high level which is an output voltage thereof to the microcomputer 2. The output signals of the comparison circuits 5 and 6 are input to an OR circuit (NOR circuit) 7 which is logic means, and the output of the OR circuit 7 is fed as a broken line fault detection signal VF to the microcomputer 2. The OR circuit 7 produces an output of the high level only when the outputs of the comparators 5 and 6 are both of the low level, i.e., produces the output of the high level only when the circuit input value $V_A$ is greater than the second threshold voltage Vc but is smaller than the first threshold value $V_B$. The output sides of the comparators 5 and 6 are connected to the power-source voltage VCC via the resistors R4 and R5.

Described below are the detection of knocking signals and operation of the ignition timing control based thereon. First, when the knocking is detected, the knocking sensor 1 is applied, as a DC bias voltage, with a power source voltage VCC that is divided by the resistors R2 and R3 since the switch 4 has been turned off. The knocking sensor 1 detects the vibration of the engine body based on the knocking of the engine. A vibration signal Vi converted from the vibration is picked up by the band-pass filter 3 as a knocking signal $V_H$ and is fed to the microcomputer 2 to produce an ignition timing adjustment signal based on the knocking signal $V_H$.

Figure 2A:
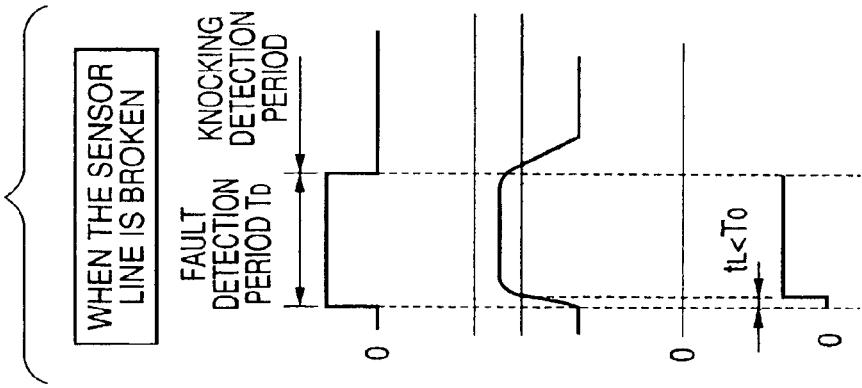
FIGS. 2A–2B are time charts illustrating the judgement of broken line fault of the device for controlling the ignition timing for internal combustion engines in a low speed range according to the embodiment 1.

Next, the fault detection operation will be described according to FIG. 2. FIG. 2 shows a time chart of when the knocking sensor 1 is normal (A) and the line is broken (B) in the low speed region of the engine. When the fault is to be detected, the microcomputer 2 produces a fault detection execution signal $V_D$. As shown in FIG. 2, the fault detection execution signal $V_D$ turns the switch 4 on during a fault detection period $T_D$, and then a current is fed from the power source to the knocking sensor 1 through the resistor R1. As a result, when the knocking sensor 1 is normal (FIG. 2A), the circuit input voltage $V_A$ applied to the terminal of the knocking sensor 1 rises with a time constant $C_0 \times (R1//R2//R3)$ in the fault detection period $T_D$. The circuit input voltage $V_A$ is compared with the first threshold value $V_B$ and the second threshold value $V_C$ in the comparison circuits 5 and 6, and the outputs thereof are supplied to an OR circuit 7. The OR circuit 7 produces an output of the high level when the two inputs are both of the low level, and produces an output of the low level in other cases. Therefore, the broken line fault detection signal $V_F$ output by the OR circuit 7 assumes the low level until the circuit input voltage $V_A$ that is rising reaches the second threshold value $V_C$ and assumes the high level when the circuit input voltage $V_A$ lies between $V_C$ and $V_B$. The microcomputer 2 monitors the broken line fault detection signal $V_F$ and calculates the sum $t_L$ of the times of the low level. When $t_L$ is longer than a predetermined period $T_0$, the knocking sensor 1 is judged to be normal (FIG. 2A).

Figure 2B:
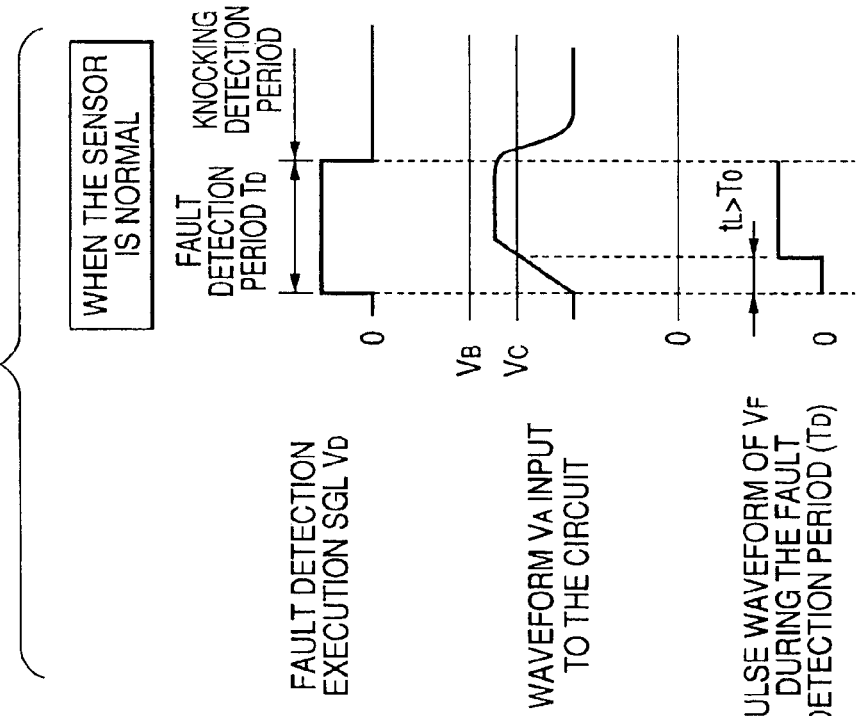

If the line of the knocking sensor 1 has been broken in the fault detection period $T_D$ by supplying a current from the power source voltage VCC via the resistor R1, since the capacity $C_0$ of the knocking sensor 1 is opened, the circuit input voltage $V_A$ is quickly raised as illustrated in FIG. 2B. Therefore, the broken line fault detection signal $V_F$ output by the OR circuit 7 maintains the low level for only a short period of time, and the circuit input voltage $V_A$ reaches the second threshold value $V_C$ in a short period of time. The microcomputer 2 finds the sum $t_L$ of the times in which the circuit input voltage $V_F$ assumes the low level. If the line of the knocking sensor 1 is broken, the sum $t_L$ becomes very short. If $t_L$ is shorter than a predetermined period of time $T_0$, the microcomputer 2 judges that the line of the knocking sensor 1 has been broken (FIG. 2B). FIGS. 2A and 2B correspond to FIGS. 3A and 3B illustrating the normal and faulty states of the knocking sensor.

Next, described below according to FIG. 3 is the fault detecting operation when the knocking sensor 1 is short-circuited to the source or is grounded. The microcomputer 2 monitors the output $V_E$ (short-circuit-to-the-source fault detection signal) of the comparator 5 and the Output $V_G$ (earthing fault detection signal) of the comparator 6 in addition to the broken line fault detection signal $V_F$ which is the output of the OR circuit 7, and finds the sum of the times of the signals assuming the low level during the fault detection period $T_D$. If the knocking sensor 1 is short-circuited to the power source (Batt) side, then, as shown in FIG. 3C, the output of the comparator 5 or the short-circuit-to-the-source fault detection signal $V_E$ assumes the high level, the output of the comparator 6 or the earthing fault detection signal $V_G$ assumes the low level, and the output of the OR circuit 7 or the broken line fault detection signal $V_F$ assumes the low level. Therefore, the sum of periods $t_L$ of the signals assuming the low level monitored by the microcomputer 2 becomes shorter than the predetermined period $T_0$ for the short-circuit-to-the-source fault detection signal $V_E$ only and, hence, the microcomputer 2 judges that the knocking sensor is faulty due to the short-circuit to the source.

On the other hand, if the knocking sensor 1 is short-circuited to the ground GND side as illustrated in FIG. 3D, the output of the comparator 5 or the short-circuit-to-the-source fault detection signal $V_E$ assumes the low level, the output of the comparator 6 or the earthing fault detection signal $V_G$ assumes the high level, and the output of the OR circuit 7 or the broken line fault detection signal $V_F$ assumes the low level. Therefore, the sum of periods $t_L$ of the signals assuming the low level monitored by the microcomputer 2 becomes shorter than the predetermined period $T_0$ for the earthing fault detection signal $V_E$ only and, hence, the microcomputer 2 judges that the knocking sensor is faulty due to the earthing.

In the foregoing was described the case where the engine was running at a low speed and the knocking signals were little distorted. Detection of fault when the engine is running at high speeds will now be described according to FIG. 4. The waveform of the input circuit voltage $V_A$ when the fault detection is executed, i.e., during the fault detection period $T_D$ is the one in which vibration signal Vi of the knocking sensor 1 is superpose on a transient voltage determined by the capacity $C_0$ of the knocking sensor 1 and by the resistors R1 to R3. The knocking sensor 1 is the one for detecting the vibrating acceleration of the engine, and the acceleration G varies in proportion to the second power of the engine rotational speed (frequency f) and is given by $G=k\omega^2 = 4\pi^2 kf^2$ (where k is a constant and $\omega$ is a rotational angular speed of the engine). The vibration signal Vi, too, is given by $Vi=kf^2$. When the engine is running at a high speed and the knocking sensor 1 is normal, the input circuit voltage $V_A$ is greatly distorted as shown in FIG. 4A.

When the switch 2 is turned on by a fault detection execution signal $V_D$, the circuit input voltage $V_A$ in case that the knocking sensor 1 is normal, rises with the time constant $C_0 \times (R1//R2//R3)$ in the fault detection period $T_D$ like in the case of the low speed range. In the high speed range, however, voltage components due to the mechanical vibration of the engine are superposed, and the waveform of $V_A$ is greatly distorted shown in FIG. 4A to traverse the second threshold value $V_C$ or the first threshold value $V_B$. As a result, the output of the OR circuit 7 or the broken line fault detection signal $V_F$ forms repetitive pulses that assume the high level only when the circuit input signal $V_A$ has a value lying between the first threshold value $V_B$ and the second threshold value $V_C$ and assume the low level when the circuit input signal $V_A$ becomes smaller than the second threshold value $V_C$ or exceeds the first threshold value $V_B$. In FIG. 4A, the pulse-like broken line fault detection signals $V_F$ maintain the low level at periods $t_1$ to $t_5$. The microcomputer 2 calculates the sum $t_L$ of the periods in which the broken line fault detection signals $V_F$ assume the low level and judges the knocking sensor 1 to be normal when it is longer than the predetermined period $T_0$. Therefore, even when the initial rising time t1 of the circuit input voltage $V_A$ is shortened by influence of the distorted waveform, the period $t_L$ for judging the fault becomes (t1+t2+t3+t4+t5). The knocking sensor is judged to be normal when $t_L$ is longer than $T_0$.

When the line of the knocking sensor 1 is broken, the voltage component due to mechanical vibration of the engine is not superposed. As shown in FIG. 4B, the circuit input voltage $V_A$ exhibits the waveform which is quite the same as that of the low engine speed region. Since the sum of times $t_L$ of the broken line fault detection signals $V_F$ of the low level is smaller than the predetermined period of time $T_0$, the microcomputer 4 judges that line of the knocking sensor 1 has been broken. When the knocking sensor 1 is short-circuited to the source or is grounded, the fault is judged in the same manner as in FIGS. 3C and 3D.

According to the embodiment of the invention, since the transient characteristics of the circuit input voltage $V_A$ of the knocking sensor 1 are converted into pulses through the comparators 5 and 6, and the sum of times of the low-level pulses output by the comparators 5, 6 and by the OR circuit 7 is compared with a predetermined period, it is possible to correctly detect the fault (short-circuit to the source, breakage of line, earthing) of the knocking sensor 1. No A/D converter is required. The fault needs not be judged relying upon the knocking signals in the high speed region unlike the conventional devices, and no judgement matching is required using knocking signals.

The invention can be utilized for a device for controlling the ignition timing of internal combustion engines of automobiles or the like.

What is claimed is:

1. A device for controlling the ignition timing for internal combustion engines taking out knocking signals by detecting the vibration of the engine body due to the knocking phenomenon and generating an ignition timing control signal relying upon the knocking signals, comprising a knocking sensor for detecting the knocking of the engine, a microcomputer for producing a fault detection execution signal to execute the detection of fault of the knocking sensor and for temporarily applying a pulse voltage to the knocking sensor relying upon the fault detection execution signal, comparison means for comparing the charging characteristics or discharging characteristics of the knocking sensor with two different threshold values at the time of applying the pulse voltage to produce an output of a low level or a high level, and logic means (NOR circuit) for obtaining an OR of the output levels of the comparison means, wherein the microcomputer finds the sum of pulse widths of output by the logic means during the period of detecting the fault and judges the fault of the knocking sensor relying upon the sum of the found pulse widths.

2. A device for controlling the ignition timing for internal combustion engines according to claim 1, wherein the microcomputer finds the sum of periods of the low level or the high level of the comparison means, and judges the fault of the knocking sensor relying upon the sum of the found periods.

* * * * *